United States Patent
Pietrowicz (10) Patent No.: US 6,694,011 B2
(45) Date of Patent: Feb. 17, 2004

(54) METHOD AND SYSTEM FOR RELIABLY DETECTING VOICEBAND SIGNALING TONES

(75) Inventor: Stanley Pietrowicz, Freehold, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 400 days.

(21) Appl. No.: 09/776,043

(22) Filed: Feb. 2, 2001

(65) Prior Publication Data

US 2002/0150233 A1 Oct. 17, 2002

(51) Int. Cl.[7] ............................................... H04M 1/00
(52) U.S. Cl. ................................. 379/386; 379/215.01
(58) Field of Search .................... 379/77, 210, 215.01, 379/282, 283, 284, 351, 386

(56) References Cited

U.S. PATENT DOCUMENTS

| | | | | |
|---|---|---|---|---|
| 4,521,647 A | * | 6/1985 | Olson et al. ................ | 379/386 |
| 5,862,210 A | * | 1/1999 | Irie et al. ................... | 379/215.01 |
| 5,926,541 A | * | 7/1999 | Irie ............................ | 379/386 |
| 6,333,974 B1 | * | 12/2001 | Liang et al. .............. | 379/215.01 |
| 6,418,209 B1 | * | 7/2002 | Fujikura et al. ......... | 379/215.01 |
| 6,584,194 B1 | * | 6/2003 | Wanner ..................... | 379/35 |

* cited by examiner 1

Primary Examiner—Xu Mei
Assistant Examiner—Jefferey Harold
(74) Attorney, Agent, or Firm—Joseph Giordano; James W. Falk; Glen Farbanish (57) ABSTRACT

Reliably detecting voiceband signaling tones at a subscriber or network device in the presence of near-end and far-end speech occurs by eliminating, rather than balancing, near-end talk-off and by separately handling far-end talkoff and near-end talkdown. A tone detector is placed on the receive path of the device. One or more frequencies that comprise the tone to be detected by the tone detector are attenuated/removed from the near-end speech present on the send path of the device thereby preventing the near-end speech from talking-off the tone detector. Near-end talkdown and far-end talkoff are eliminated by utilizing two separate signal-to-guard ratios within the tone detector: a large signal-to-guard ratio to combat the effects of the far-end talkoff and a small signal-to-guard ratio to combat the effects of the near-end talkdown. The tone detector is switched between the two signal-to-guard ratios by predicting whether the near-end is speaking. This prediction is made by monitoring the presence of near-end speech present in the send-path of the device and by utilizing the fact that the typical conversation alternates between far-end and near-end speakers. Based on near-end speech activity, the tone detector is switched between the large and small signal-to-guard ratios to combat the effects of far-end talkoff and near-end talkdown, respectively.

20 Claims, 6 Drawing Sheets

METHOD AND SYSTEM FOR RELIABLY DETECTING VOICEBAND SIGNALING TONES

BACKGROUND OF MY INVENTION

1. Field of the Invention

My invention relates generally to the detection of voiceband signaling tones sent by a network component to a subscriber device or sent by a subscriber device to a network component. More particularly, my invention relates to methods and apparatus for reliably detecting voiceband-signaling tones in the presence of near-end and far-end speech.

2. Description of the Background

The Public Switched Telephone Network (PSTN) has long used combinations of discrete voiceband frequencies to carry signaling tones between an analog subscriber device and a serving switch. A common example is touch-tone-dialing where signaling tones are sent from a subscriber device to a tone detector on the serving switch to initiate a phone conversation. Other services, such as Calling Identity Delivery on Call Waiting (CIDCW), Analog Display Services Interface (ADSI Services), and Calling Number Delivery are initiated by a serving switch or service node sending voiceband signaling tones to a detector on a subscriber device.

Voiceband signaling tones, whether initiated by a serving switch, a service node, or a subscriber device, are best transmitted under controlled conditions where extraneous "noise," such as near-end and far-end speech, music, etc. (hereinafter collectively referred to as speech) is not present and therefore cannot interfere with the recognition of these tones. For example, a subscriber's handset is muted while entering touch-tone digits, and services such as Calling Number Delivery occur while the subscriber device is in the on-hook state.

However, an increasing number of applications have emerged where voiceband signaling needs to occur under uncontrolled noisy conditions where near-end and far-end speech can mask a signaling tone or imitate a tone. As a result, the services these tones are intended to activate either fail to activate or are falsely activated. Such service reliability problems directly impact customer satisfaction and therefore service marketability.

For example, CIDCW and ADSI services require tone detection at a subscriber device and can occur asynchronously at any time during a call. These services are initiated by a serving switch/service node sending a CPE Altering Signal (CAS signal) to a subscriber device thereby triggering the device to temporarily exit voice operation and enter data mode operation. Because these services can be activated any time during a call, the CAS detector memo within the subscriber device needs to remain active for the duration of the call and must successfully discern a valid CAS signal from any speech present on the interface emanating from the near-end or far-end. Similar issues exist for services such as voice-mail, where tone detection at a network device is required.

The imitating and masking of signaling tones is formally referred to as "Talkoff" and "Talkdown". Talkoff occurs when near-end or far-end speech erroneously triggers the signaling tone detection system (i.e., the tone detector accepts an imitation signal). Talkdown occurs when a signaling tone is sent but the signaling tone detection system fails to recognize the tone because it is masked by near-end or far-end speech (Note that for the remainder of this discussion I assume that far-end talkdown is not an issue because the device sending the tone typically mutes the far-end prior to transmission.).

Talkoff and talkdown are difficult to mitigate because the two issues simultaneously exist in many environments and they have an inverse relationship. To successfully deal with talkoff, a tone detection system must resist imitation signaling tones produced by speech by rejecting "non-pure" signals. To successfully deal with talkdown, a tone detection system must recognize weak signaling tones in the presence of speech and therefore accept "non-pure" signals as valid tones. As a result, good talkoff performance is usually achieved by sacrificing talkdown performance, and good talkdown performance is usually achieved by sacrificing talkoff performance.

The difficulty in mitigating talkoff and talkdown is illustrated by the concept of "guard-action," which is the typical means utilized by signaling tone detection systems to deal with talkoff. Under this concept, a tone detector measures a "signal-to-guard" ratio to determine the purity of a signal. Signal-to-guard ratio is the ratio of the power present at a signaling-tone-frequency to the power of speech in one or several designated "guard-bands". Guard-bands essentially provide a relative measure of the speech present on a line. Talkoff is circumvented by requiring a large signal-to-guard ratio because a large ratio ensures that a detected tone is relatively pure with respect to the guard-band(s) and is not a simple imitation that will trigger the detector. Talkdown, on-the-other-hand, is circumvented by requiring a small signal-to-guard ratio because a small ratio ensures that an actual tone signal is not lost among the interfering speech. As a result, good talkoff performance creates talkdown because a valid signaling tone superimposed on speech may fail to satisfy the talkoff signal-to-guard ratio requirement. Good talkdown performance creates talkoff because an imitation signaling tone created by speech can easily satisfy the lax talkdown signal-to-guard ratio requirement.

Prior-art tone detection systems have been prone to reliability problems because rather than eliminate talkoff and talkdown, they have attempted to simultaneously balance/address talkoff and talkdown. This balancing ultimately leads to tradeoffs and thereby compromised performance of the overall tone detection system and the associated services that it supports.

Figure 1:
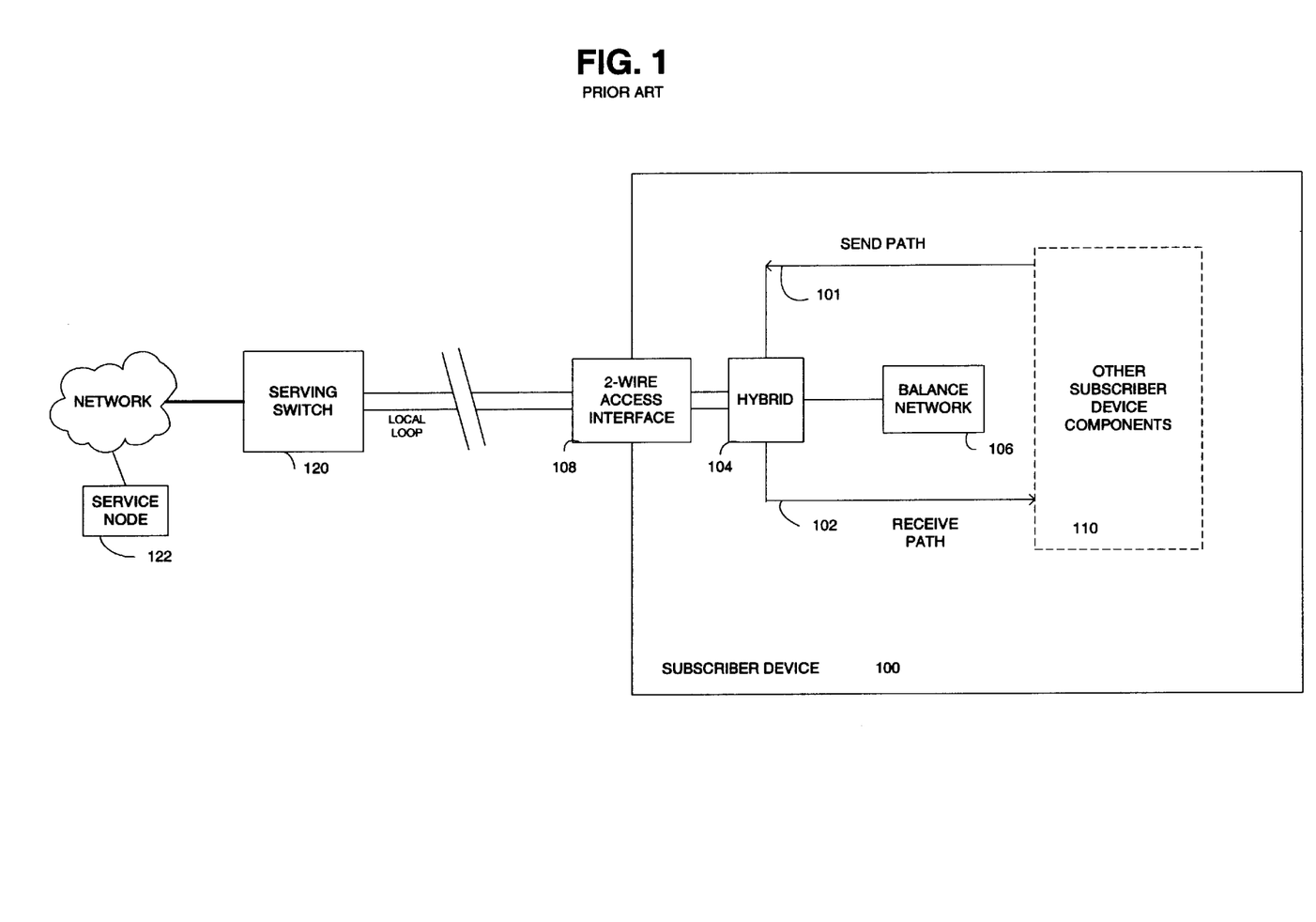
FIG. 1 illustrates a subscriber device relevant to prior-art voiceband signaling tone detection systems and the signaling tone detection apparatus of my invention.

Tone detection within a subscriber device, such as a phone or caller-id box, will be used as the basis for the remainder of this discussion. Nonetheless, my invention is also applicable to tone detection within a network device. As a base reference, FIG. 1 depicts a subscriber device 100 common to the prior-art and my invention. Subscriber device 100 comprises: (1) 2-wire access interface 108, which interconnects subscriber device 100 to serving switch 120 and service node 122; (2) hybrid 104, which converts the 2-wire access interface to a 4-wire access interface consisting of send path 101 and receive path 102; (3) balance network 106, which reduces the reflection of near-end speech from send path 101 on receive path 102; and, (4) other device components 110, which are not related to the operation of my invention, but are common in many communication applications.

Figure 2:
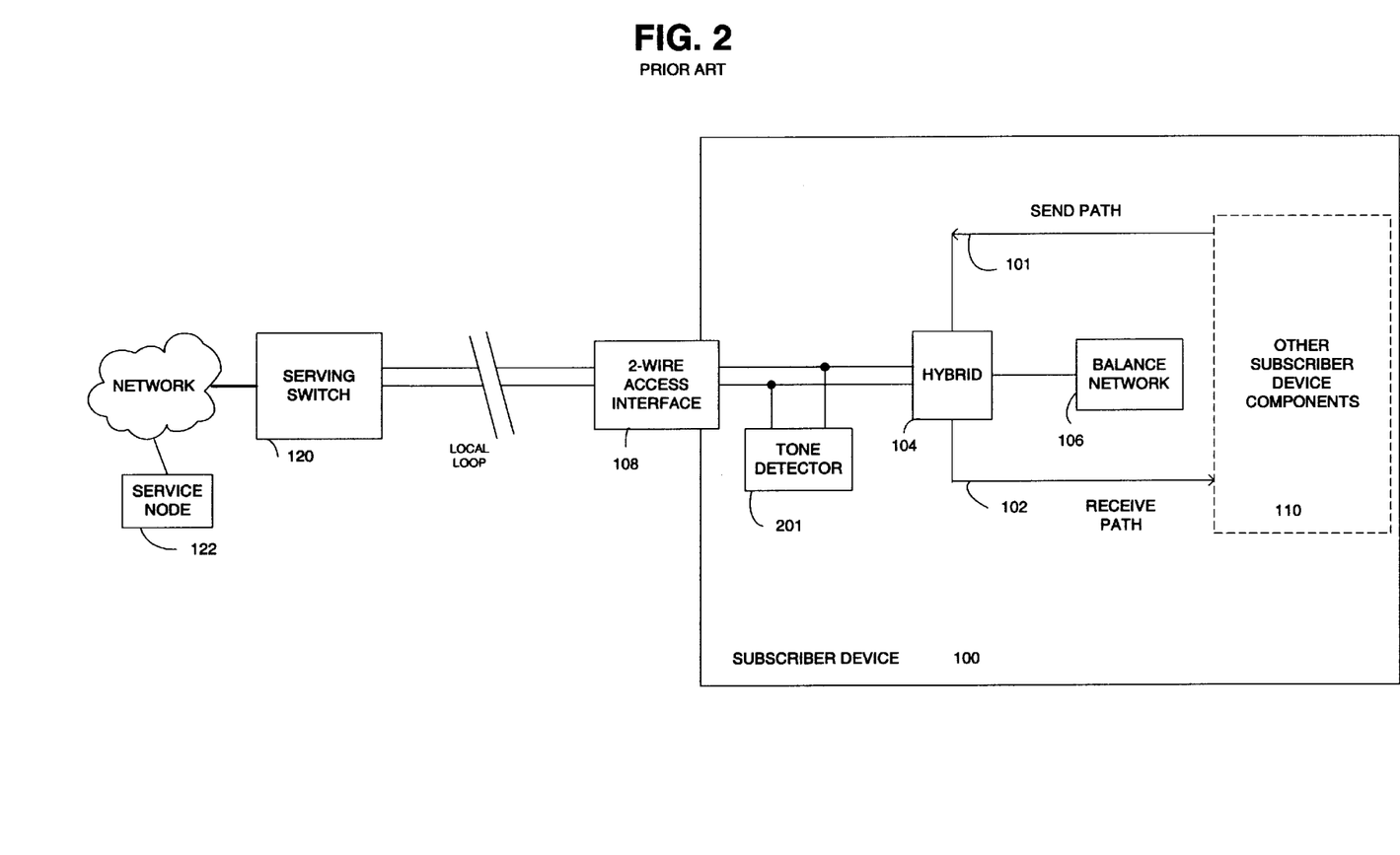
FIG. 2 illustrates a first prior-art voiceband signaling tone detection system applied to the subscriber device of FIG. 1 wherein a tone detector is placed across the two-wire interface between the subscriber device and the serving switch/service node.

FIG. 2 illustrates a first prior-art system where tone detector 201 is placed across 2-wire access interface 108. In this location, tone detector 201 must simultaneously deal with talkoff and talkdown and therefore balance the two issues, inherently leading to non-ideal detection performance. More important, this balance is extremely difficult and expensive to achieve because no effort has been made to reduce the strength of the near-end voice incident upon the tone detector and the detector must therefore balance two extremes—significant guard-band to resist near-end talkoff and significantly reduced guard-band to prevent near-end talkdown.

Figure 3:
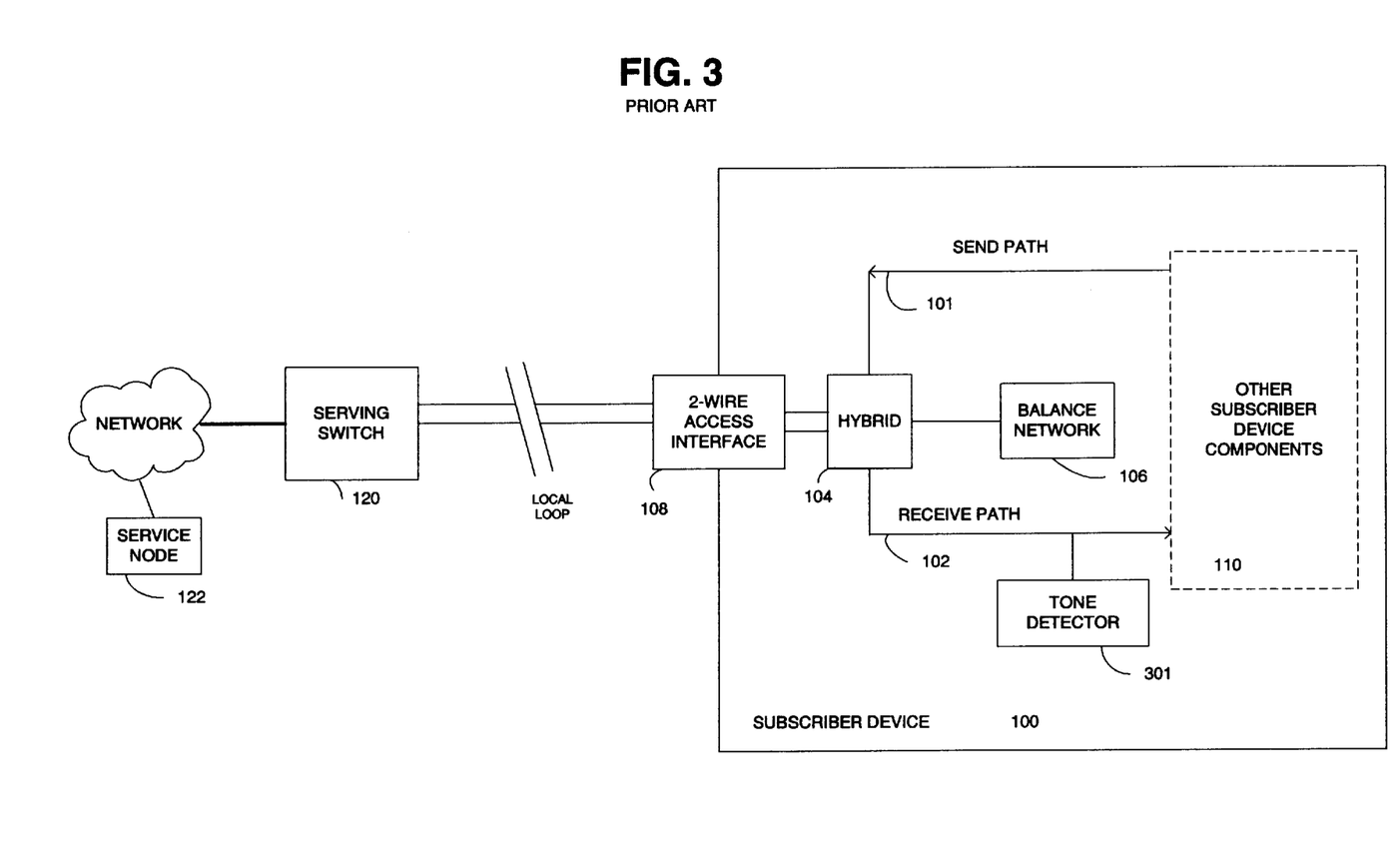
FIG. 3 illustrates a second prior-art voiceband signaling tone detection system applied to the subscriber device of FIG. 1 wherein a tone detector is placed across the receive path of the hybrid.

FIG. 3 illustrates a second prior-art system where tone detector 301 is placed across receive path 102 of the balance hybrid. Advantageously, this solution uses the transhybrid loss to attenuate the strength of the near-end speech incident upon the tone detector thereby addressing both near-end talkoff and near-end talkdown. However, due to the complexity of speech and the difficulty in achieving a perfect match between the balance network and the impedance presented by the local-loop interface, the hybrid does not completely eliminate the near-end speech. Specifically, because network impedance can vary widely depending on loop composition, loading, switch type, and the presence of any parallel subscriber equipment, hybrid 104 can produce less than 2 dB of transhybrid loss. As a result, a tone detector designed to balance talkoff and talkdown performance at a good transhybrid loss may function poorly under conditions when the hybrid is not providing sufficient loss. If the designer were to attempt to strike the performance balance at the worst case transhybrid loss of 2 dB, the benefit that was to be provided by this scheme would be essentially lost.

Figure 4:
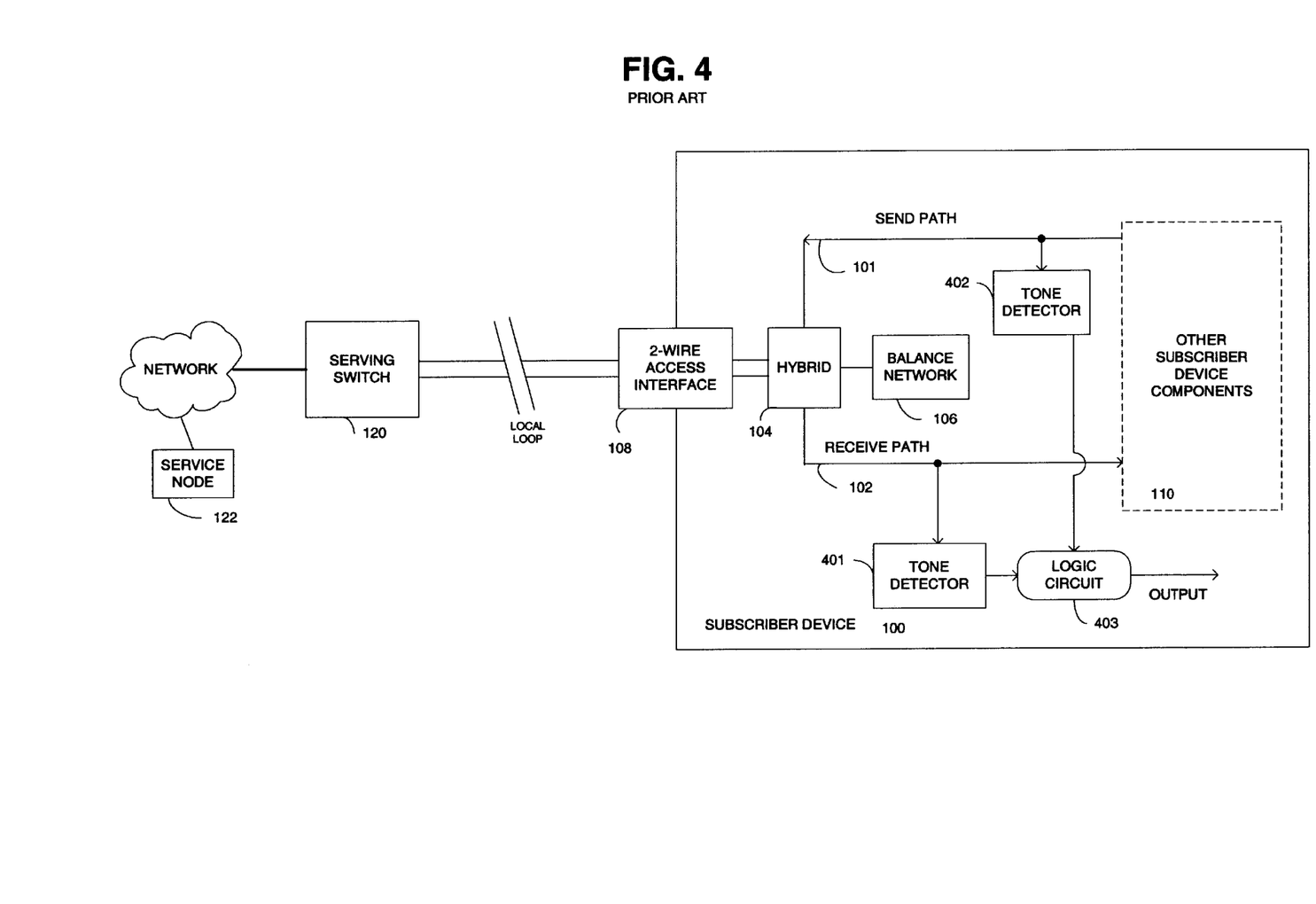
FIG. 4 illustrates a third prior-art voiceband signaling tone detection system applied to the subscriber device of FIG. 1 wherein two identical tone detectors are employed, one across the receive path of the hybrid and one across the send path of the hybrid.

FIG. 4 illustrates a third prior-art system where two identical tone detectors, 401 and 402, are placed across receive path 102 and send path 101 respectively. The two tone detectors are connected through logic circuit 403, which controls the triggering of a tone based on the output of the two detectors. Advantageously, this solution removes near-end talkoff because logic circuit 403 remains idle whenever tone detector 402 registers a tone. Logic circuit 403 registers a tone only when tone detector 401 alone registers a tone, as shown by Table 1 below. One drawback of this solution is that any feedback of the alerting signal from other subscriber device components, such as a speakerphone, can cause detector 402 to activate and cause a valid signaling tone to be rejected. A second drawback is that this solution, like FIG. 3, does not provide any additional help to block near-end speech incident upon tone detector 401 and as a result, tone detector 401 must continue to balance/tradeoff far-end talkoff and near-end talkdown performance.

TABLE 1

Operation of Tone Detectors 401–402 and Logic Circuit 403

| Tone Detector (401) | Tone Detector (402) | Output of Logic Circuit (403) |
| --- | --- | --- |
| Idle | Idle | Idle |
| Idle | Detect | Idle |
| Detect | Detect | Idle |
| Detect | Idle | Detect |

Figure 5:
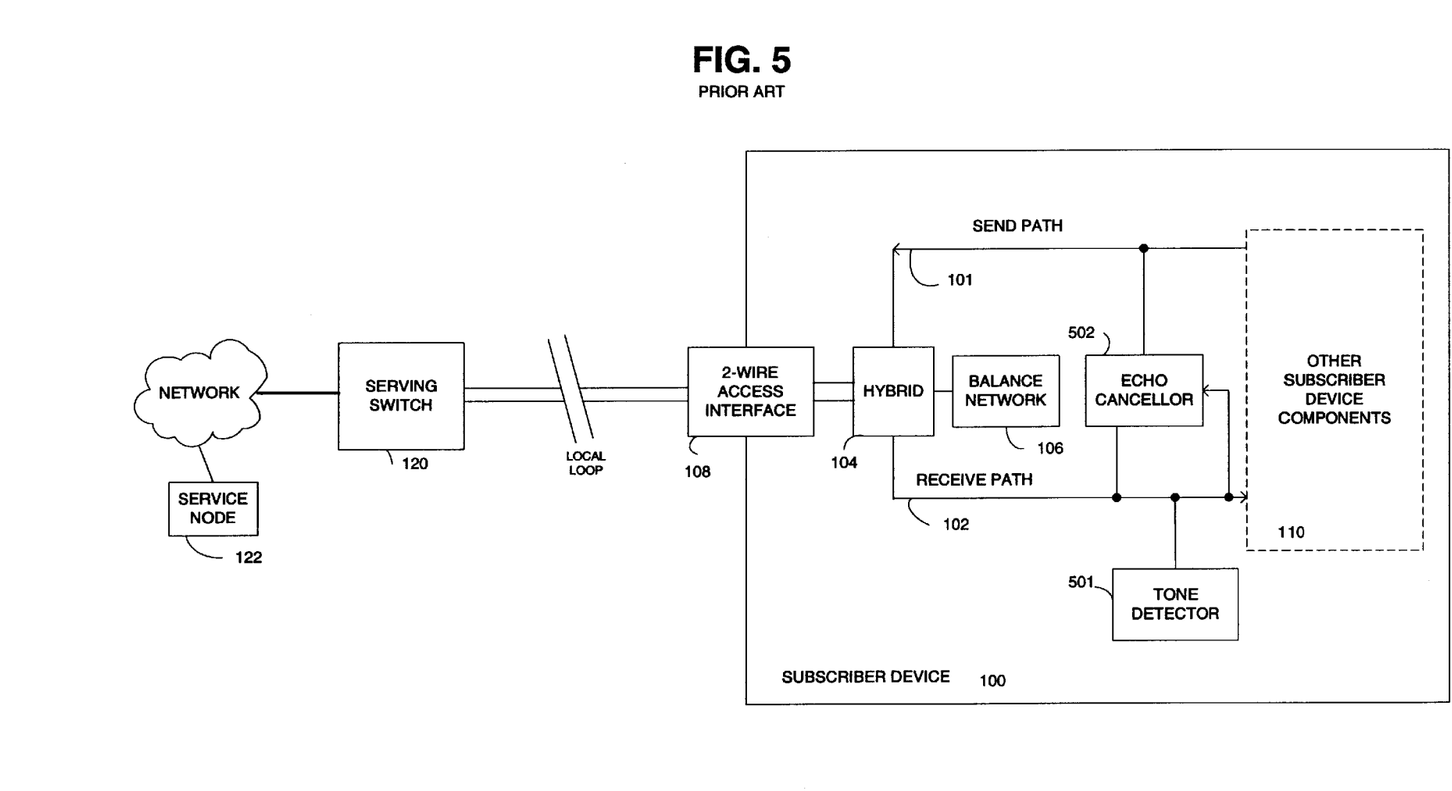
FIG. 5 illustrates a fourth prior-art voiceband signaling tone detection system applied to the subscriber device of FIG. 1 wherein an echo canceller is employed in addition to a tone detector across the receive path of the hybrid.

FIG. 5 illustrates a forth prior-art system where echo canceller 502 is inserted between send path 101 and receive path 102. Unlike the above solutions, this solution offers significantly better near-end talkoff and near-end talkdown performance by highly attenuating near-end speech incident upon tone detector 502. As a result, tone detector 502 need only address far-end talkoff and hence, little balance/tradeoff needs be made. The problem with this solution however is that it is quite expensive as compared to the cost of the typical subscriber device.

SUMMARY OF MY INVENTION

It is desirable to have methods and apparatus that overcome the disadvantages of prior-art systems and provide for the reliable detection of voiceband signaling tones that occur in the presence of near-end and far-end speech. With the exception of the system shown in FIG. 5, prior-art tone-detection systems have been problem-prone because they have attempted to simultaneously balance the effects of talkoff and talkdown leading to tradeoffs and thereby non-ideal system and service performance. Other prior-art systems, such as the system shown in FIG. 5, have attempted to eliminate talkoff and talkdown but at an expensive cost. Similar to the prior-art, my invention uses a tone detector across receive path 102. However, rather than balance the effects of near-end and far-end talkoff and talkdown, my invention overcomes the shortcomings of the prior-art and reliably detects voiceband signaling tones by selectively notching near-end speech energy and actively adjusting the signal-to-guard ratio based on the presence of near-end speech energy.

Specifically, my invention overcomes near-end talkoff through the use of a notch-filter inserted in send path 101. This notch-filter attenuates/removes from the near-end speech one or more of the frequencies that comprise the signaling tone to be detected by the tone detector. As such, any non-notched signaling components produced by the near-end speech that pass through the hybrid and appear on receive path 102 are "invalid" with respect to the tone detector. As a result of the notch-filter, near-end talkoff should be practically eliminated.

My invention overcomes the issues of near-end talkdown and far-end talkoff by utilizing two separate signal-to-guard ratios within the tone detector: a large signal-to-guard ratio to combat the effects of the far-end talkoff and a small signal-to-guard ratio to combat the effects of the near-end talkdown. My invention switches between the two signal-to-guard ratios by predicting whether the near-end or far-end is speaking. This prediction is made by monitoring the presence of near-end speech through the use of a speech energy detector inserted in send path 101 and by utilizing the fact that the typical "conversation" alternates between far-end and near-end parties. Based on this prediction, my invention correspondingly switches the tone detector to a large signal-to-guard ratio to combat the effects of far-end talkoff or to a small signal-to-guard ratio to combat the effects of near-end talkdown. Unlike the prior-art, my tone detector behaves like two detectors—a low guard detector that resists talkdown when the near-end is talking (and cannot be talked-off by the near-end due to the notch-filter) and a high guard detector that resists talkoff when the far-end is talking and the near-end is quiet. As a result, there is no need to force a single balance between talkoff and talkdown that can ultimately lead to non-ideal performance.

DETAILED DESCRIPTION OF MY INVENTION

Figure 6:
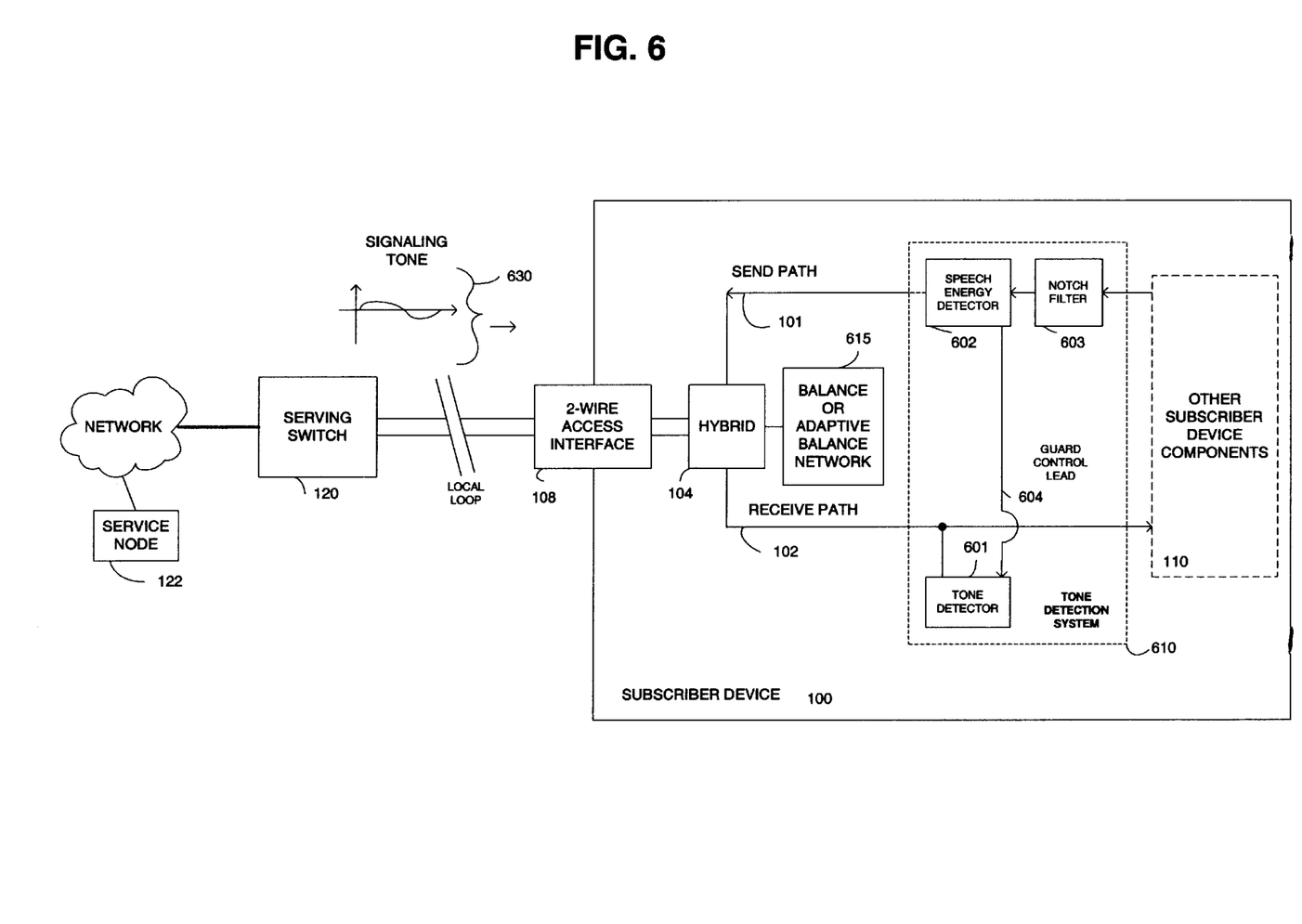
FIG. 6 is a schematic representation of one illustrative embodiment of my invention applied to the subscriber device of FIG. 1.

Turning to FIG. 6, there is depicted one illustrative embodiment of the tone detection system 610 of my invention applied to the subscriber device of FIG. 1. Tone detection system 610 comprises: (1) tone detector 601 placed across receive path 102 to detect signaling tone 630 sent by serving switch 120 or service node 122 to activate a service; (2) notch-filter 603 embedded in send path 101 and specifically tuned to filter from the near end-speech one or more frequencies comprising signaling tone 630; (3) speech energy detector 602 embedded in send path 101 to detect the presence of near-end speech; and, (4) guard-control-lead 604 interfacing speech energy detector 602 and tone detector 601 to control the characteristics of tone detector 601 based on the presence or absence of near-end speech. My invention separately addresses each of near-end talkoff, far-end talkoff, and near-end talkdown through frequency rejection/attenuation and temporal control of detector characteristics as compared to the prior-art, which attempts to balance these issues simultaneously through performance tradeoff.

Beginning with near-end talkoff, traces of near-end speech on send path 101 pass through hybrid 104 and appear on receive path 102. Hybrid 104 and balance network 615 reduce but do not completely eliminate the presence of this speech. As such, near-end speech can falsely trigger tone detector 601 as was described above for the prior-art systems. My invention resolves this issue by eliminating near-end talkoff through the use of notch-filter 603, which filters the near-end speech and removes one or more of the signaling frequencies that comprise signaling tone 630 prior to the speech entering hybrid 104. As a result, the near-end speech appearing on receive path 102 does not contain the signaling tone and therefore cannot falsely trigger tone detector 601. Note that the frequencies comprising a signaling tone typically have a tolerance band and are within certain percentage points of the nominal frequency. As such, notch-filter 603 actually filters a complementary band for one or more of the frequencies comprising signaling tone 630.

Because frequency removal can adversely affect speech quality as perceived by the far-end, I incorporate several techniques in notch-filter 603 in another embodiment of my invention to help minimize the effect on voice quality. First, signaling tones are typically comprised of two or more frequencies to help prevent talkoff and talkdown. Tone detector 601 must detect each of these frequencies in order to trigger the presence of a valid tone. As a result, notch-filter 603 is designed to remove only one of the plurality of frequencies that comprises signaling tone 630 to ensure that the near-end speech does not imitate a valid tone. Second, of the plurality of frequencies that comprise signaling tone 630, notch-filter 603 is designed to remove the "highest" frequency because high-end frequencies are typically attenuated by the local loop and users may therefore not notice any difference in speech quality since it occurs during normal calls. Third, notch-filter 603 does not actually remove the frequency but highly attenuates the frequency as much is necessary to minimize the effect of its presence at tone detector 601. In attempting to minimize the required amount of filter attenuation, I subtract from the needed attenuation the amount of loss that hybrid 104 and balance network 615 will provide. The required amount of attenuation could be further reduced by replacing balance network 615 with an adaptive balance network to improve the transhybrid loss.

Although notch-filter 603 eliminates near-end talkoff, tone detector 601 is still subject to near-end speech and far-end speech that can cause near-end talkdown and far-end talkoff, respectively. As previously described in the prior-art, these two problems have an inverse relationship making it difficult to simultaneously balance both. My invention overcomes this balancing problem by utilizing two separate signal-to-guard-ratios within tone detector 601: a large signal-to-guard ratio to combat the effects of far-end talkoff and a small signal-to-guard ratio to combat the effects of near-end talkdown. My invention predicts whether the near-end or far-end is speaking and correspondingly switches tone detector 601 between the two guard-ratios based on this prediction. When the near-end is quiet, tone detector 601 is switched to the large signal-to-guard ratio to combat far-end talkoff. When the near-end is speaking, tone detector 601 is switched to the small signal-to-guard ratio to combat near-end talkdown. Unlike the prior-art, near-end talkdown and far-end talkoff are handled by separate detector characteristics.

To predict which end is speaking, my invention utilizes speech energy detector 602 and the fact that the typical conversation alternates between parties. Specifically, the typical conversation is characterized by the near-end and far-end parties alternating speech, with both near-end and far-end parties each speaking 40% of the call-time and the remaining 20% of the call-time being silence and less frequently, doubletalk. Doubletalk occasionally occurs but typically does not last for long periods. Through the use of speech energy detector 602, my invention monitors the presence/absence of near-end speech on send path 101. When speech energy detector 602 registers the presence of near-end speech beyond a preset or adaptive threshold, the near-end is assumed to be speaking. Under this scenario, speech energy detector 602 switches tone detector 601, through guard-control lead 604, to the small signal-to-guard ratio so that tone detector 601 can detect any signaling tone transmitted while the near-end is speaking (i.e., combat talkdown). When speech energy detector 602 registers the absence of near-end speech (i.e., below a preset or adaptive threshold), speech energy detector 602 switches tone detector 601 to the large signal-to-guard ratio to prevent tone detector 601 from being falsely triggered (i.e., combat talkoff) from any far-end speech. During silent intervals when neither party is speaking, speech energy detector 602 maintains a large signal-to-guard ratio to prevent line noise from possibly triggering tone detector 601. Table 2 summarizes the operation of speech energy detector 602 and tone detector 601.

TABLE 2

Operation of Speech Energy Detector 602 and Tone Detector 601

| Speech Energy Detector (602) | Tone Detector (601) |
| --- | --- |
| Near-End Speech Present | Employ Small/Reduced Signal-to-Guard Ratio |
| Near-End Speech Absent | Employ Large/Increased Signal-to-Guard Ratio |

The above-described embodiment of my invention is intended to be illustrative only. Numerous other embodiments may be devised by those skilled in the art without departing from the spirit and scope of my invention.

I claim:

1. A tone detection system for reliably detecting a signaling tone, wherein said signaling tone comprises one or more frequencies, said tone detection system comprising:
    a tone detector configurable to a first or second state and for detecting said signaling tone while in said first or second state,
    a notch-filter for attenuating from near-end audio at least one frequency comprising said signaling tone to prevent said near-end audio from talking-off said tone detector, and
    a speech energy detector for detecting the presence or absence of near-end audio and switching said tone detector between said first or second state based on the presence or absence of near-end audio,
    wherein said first state comprises a large signal-to-guard ratio for combating far-end talkoff and wherein said second state comprises a small signal-to-guard ratio for combating near-end talkdown.

2. The tone detection system of claim 1 wherein detecting the presence of near-end audio switches said tone detector to said small signal-to-guard ratio and detecting the absence of near-end audio switches said tone detector to said large signal-to-guard ratio.

3. The tone detection system of claim 1 wherein said notch-filter removes at least one frequency comprising said signaling tone.

4. The tone detection system of claim 1 wherein said tone detection system is embedded within a subscriber device.

5. The tone detection system of claim 1 wherein said signaling tone is a voiceband signaling tone.

6. The tone detection system of claim 1 wherein said tone detection system is embedded within a device comprising a send path and a receive path wherein:
    said tone detector is across said receive path,
    said notch-filter is embedded in said send path, and
    said speech energy detector is embedded in said send path.

7. A tone detection system for reliably detecting a signaling tone, wherein said signaling tone comprises one or more frequencies, said tone detection system comprising:
    a tone detector configurable to a first or second state and for detecting said signaling tone while in said first or second state,
    a notch-filter for attenuating from near-end audio at least one frequency comprising said signaling tone to prevent said near-end audio from talking-off said tone detector, and
    a speech energy detector for detecting the presence or absence of near-end audio and switching said tone detector between said first or second state based on the presence or absence of near-end audio;
    wherein the signaling tone comprises at least two frequencies and said notch-filter attenuates the highest of said frequencies.

8. A method for reliably detecting a signaling tone, wherein said signaling tone comprises one or more frequencies, said method comprising:
    detecting said signaling tone while in a first or second state, wherein said first and second state are configurable,
    attenuating from near-end audio at least one frequency comprising said signaling tone to prevent near-end talkoff,
    detecting the presence or absence of near-end audio, and
    switching between said first or second detection states based on detecting the presence or absence of near-end audio,
    wherein said first detecting state comprises a large signal-to-guard ratio for combating far-end talkoff and wherein said second detecting state comprises a small signal-to-guard ratio for combating near-end talkdown.

9. The method of claim 8 wherein said switching step further comprises switching to said small signal-to-guard ratio based on detecting the presence of near-end audio and switching to said large signal-to-guard ratio based on detecting the absence of near-end audio.

10. The method of claim 8 wherein said attenuating step removes at least one frequency comprising said signaling tone.

11. The method of claim 8 wherein said signaling tone is a voiceband signaling tone.

12. A method for reliably detecting a signaling tone, wherein said signaling tone comprises one or more frequencies, said method comprising:
    detecting said signaling tone while in a first or second state, wherein said first and second state are configurable,
    attenuating from near-end audio at least one frequency comprising said signaling tone to prevent near-end talkoff,
    detecting the presence or absence of near-end audio, and
    switching between said first or second detection states based on detecting the presence or absence of near-end audio,
    wherein the signaling tone comprises at least two frequencies and said attenuating step further comprises attenuating the highest of said frequencies.

13. A tone detection system within a first device for reliably detecting a voiceband signaling tone sent by a second device, wherein said first device comprises a send path and receive path, and wherein said signaling tone comprises one or more frequencies, said tone detection system comprising:
    a tone detector across said receive path for detecting said voiceband signaling tone, wherein said tone detector is configurable to either a first state comprising a small signal-to-guard ratio for combating near-end talkdown or a second state comprising a large signal-to-guard ratio for combating far-end talkoff, and
    a speech energy detector embedded in said send path for detecting the presence of near-end audio, wherein said speech energy detector switches said tone detector between said first or second state based on the presence or absence of near-end audio respectively.

14. The tone detection system of claim 13 further comprising
 a notch-filter embedded in said send path for attenuating from near-end audio at least one frequency comprising said signaling tone to prevent said near-end audio from talking-off said tone detector.

15. The tone detection system of claim 14 wherein the signaling tone comprises at least two frequencies and said notch-filter attenuates the highest of said frequencies.

16. The tone detection system of claim 14 wherein said first device is a subscriber device.

17. A method for reliably detecting within a first device a voiceband signaling tone sent by a second device, wherein said first device comprises a send path and receive path, and wherein said signaling tone comprises one or more frequencies, said method comprising:
 detecting at the receive path said voiceband signaling tone, wherein said detecting occurs while either in a first state comprising a small signal-to-guard ratio for combating near-end talkdown or a second state comprising a large signal-to-guard ratio for combating far-end talkoff,
 detecting the presence or absence of near-end audio in said send path, and
 switching between said first or second state based on the presence or absence of near-end audio respectively.

18. The method of claim 17 further comprising the step of
 attenuating from near-end audio present in said send path at least one frequency comprising said signaling tone to prevent near-end talkoff.

19. The method of claim 18 wherein said signaling tone comprises at least two frequencies and said attenuating step further comprises attenuating the highest of said frequencies.

20. The method of claim 18 wherein said attenuating step removes at least one frequency comprising said signaling tone.

* * * * *